United States Patent [19]

Andricacos et al.

[11] Patent Number: 5,132,859
[45] Date of Patent: Jul. 21, 1992

[54] THIN FILM STRUCTURES FOR MAGNETIC RECORDING HEADS

[75] Inventors: Panayotis C. Andricacos, Croton-on-Hudson; Jei-Wei Chang, Tuckahoe; Bojan Petek, Croton-on-Hudson; Lubomyr T. Romankiw, Briarcliff, all of N.Y.

[73] Assignee: International Business Machines Corporation, Armonk, N.Y.

[21] Appl. No.: 571,944

[22] Filed: Aug. 23, 1990

[51] Int. Cl.$^5$ .................. G11B 5/133; G11B 5/33
[52] U.S. Cl. ..................... 360/113; 360/126; 428/928
[58] Field of Search .............. 360/126, 113; 428/611, 428/678, 668, 928

[56] References Cited

U.S. PATENT DOCUMENTS

| | | | |
|---|---|---|---|
| 3,639,699 | 2/1972 | Tiemann | 360/126 |
| 3,867,368 | 2/1975 | Lazzari | 360/126 |
| 4,587,178 | 5/1986 | Shimizu et al. | 428/928 X |
| 4,610,935 | 9/1986 | Kumasaka et al. | 428/928 X |
| 4,731,300 | 3/1988 | Watanabe et al. | 428/928 |
| 4,798,765 | 1/1989 | Ishizaka et al. | 428/611 X |

OTHER PUBLICATIONS

*IEEE Transactions on Magnetics,* vol. Mag-21, No. 5: 1578-1580 (Sep. 1985) Y. Nakamura, et al. "Analysis of Domain Structure of Single Pole Perp. Head".
*IEEE Transactions on Magnetics,* vol. Mag-13, No. 5: 1521-1523 (Sep. 1977) J. S. Y. Feng & D. A. Thompson "Permeability of Narrow Permalloy Stripes".
*IEEE Transactions on Magnetics,* vol. 24, No. 3: 2045-2054 (May, 1988) J. C. Slonczewski, et al. "Micromagnetics of Laminated Permalloy Films".

*Primary Examiner*—John H. Wolff
*Attorney, Agent, or Firm*—Scully, Scott, Murphy & Presser

[57] ABSTRACT

A magnetic thin film structure comprising a first layer of magnetic material having a low anisotropy $H_k$ magnetically coupled to a second layer magnetic material having a high anisotropy $H_k$ and a low coercivity. The laminate provides a dual anisotropy behavior such that the laminate exhibits a high initial permeability at relatively small applied fields during the read operation and a high anisotropy at high applied fields during the write operation. The laminate of the present invention reduces inductive head domain instability produced by the write operation while maintaining high reproducing sensitivity during the read operation. Use of the higher $H_k$ material also reduces the sensitivity of the head performance to variation in process-induced stresses.

33 Claims, 5 Drawing Sheets

THIN FILM STRUCTURES FOR MAGNETIC RECORDING HEADS

BACKGROUND OF THE INVENTION

1. Field of the Invention

The present invention relates to thin film structures for magnetic recording heads and more particularly, to laminated thin film structures formed of unique combinations of materials, the laminates having improved magnetic properties ideally suited for poles of read-/write inductive heads.

2. Description of the Prior Art

Magnetic recording at very high areal density places stringent requirements on magnetic properties of the materials used for forming the poles of magnetic recording heads. Good reproducing sensitivity requires a pole material with a high initial permeability, $\mu_i$, and a low coercivity, $H_c$. Since $$\mu_i \simeq \frac{4\pi M_s}{H_k},$$

where $M_s$ is the magnetization at saturation a $H_k$ is the anisotropy magnetic field, a high $\mu_i$ suggests a choice of $H_k$ as small as possible. The most commonly used head material having a high $\mu_i$ and a low anisotropy field, $H_k$ is permalloy. However, it has been shown by Nakamura, et al., IEEE Trans. Mag. 21(5) 1985, that too low an anisotropy results in undesirable domain patterns in narrow poletips. For domain stability in poletips less than 5 $\mu$m wide, it is desirable to use a material with $H_k$ greater than that achievable with permalloy. However, increasing $H_k$ to a high value has the adverse effect of decreasing the reproducing sensitivity by decreasing $\mu_i$.

One prior art attempt to combine beneficial magnetic properties of two materials can be found in U.S. Pat. No. 3,639,699 to Tiemann, which discloses a thin film structure formed by a layer of magnetic material having a high initial permeability, such as permalloy and a second layer of magnetic material having a lower initial permeability and a higher saturation flux density than the permalloy layer. The low $\mu_i$ materials disclosed by Tiemann are pure cobalt, pure iron or a CoFe alloy. Tiemann teaches that the poletip of this prior art lamination is formed with the inner layer of permalloy and the outer layer of the lower permeability material. The aim of the Tiemann lamination is to provide a recording head having a read/write gap effectively wider for the writing function than it is for the reading function. Tiemann fails to recognize the effect of domains on recording efficiency and readback instability. The high moment materials suggested by Tiemann are likely to cause a multitude of metastable domain states in the permalloy, because these high moment materials have unacceptably high coercivity.

U.S. Pat. No. 3,867,368 to Lazzari includes a decoupling layer between the laminations of the high initial permeability material and the lower initial permeability material. As noted in Lazzari, the lower initial permeability materials, such as Co, Fe or CoFe, also have a higher anisotropy field than permalloy. Lazzari suggests that the exchange coupling between high and low permeability materials is undesirable and therefore inserts a layer that breaks down the coupling.

In the above described prior art, laminated thin film structures have been found to be deficient in that the materials used by Tiemann, namely Co, Fe and CoFe, have a high coercivity which acts to decrease the head stability and reproducing sensitivity. Addition of the non-magnetic spacer by Lazzari reduces problems caused by the high coercivity of one of the sublayers, but it also decreases potential benefits, when both magnetic layers have a low coercivity, and a relatively strong exchange coupling. Thus, there is a need to provide a thin film magnetic structure for use in read/write heads in which the reproducibility of the read operation is improved, without sacrificing head efficiency.

SUMMARY OF THE INVENTION

The present invention is directed to a magnetic thin film structure comprising a lamination of magnetic materials having all of the advantageous properties for narrow poletips achieved simultaneously. The thin film structure of the invention is comprised of a laminate of a first layer of magnetic material having a low anisotropy field $H_k$ of less than 5 Oersteds (Oe), being magnetically coupled to a second layer of magnetic material having a high anisotropy field $H_k$ in excess of about 10 Oe and a low coercivity $H_c$ of less than 2 Oe. The first layer of magnetic material is a high initial permeability material such as permalloy. An example of the magnetic material having the high anisotropy and low coercivity suitable to be used as the second layer of the inventive laminate is an alloy of cobalt-iron-copper (CoFeCu). The CoFeCu alloy having the required magnetic properties for the inventive laminate is disclosed in U.S. patent application Ser. No. 571,804 assigned to the same assignee as, and filed concurrently with, the present application, the entire specification of which is incorporated herein by reference.

The laminate of the present invention exhibits a dual anisotropy behavior. The laminate of the invention thus exhibits a high initial permeability at relatively small applied magnetic fields during the read operation and in addition, the laminate exhibits a high anisotropy field at large applied magnetic fields. The high $\mu_i$ at small fields results in good reproducing sensitivity and the high $H_k$ at large fields results in improved domain stability, following the write operation. The low coercivity of the second layer of the laminate eliminates the adverse effects to the reproducing sensitivity by the prior art low initial permeability but higher coercivity materials. Thus, the laminate of the invention is especially suitable for forming poletips and yoke regions of read/write magnetic recording heads.

Various alternative embodiments will provide adjustability of the dual anisotropy behavior thereby allowing the invention to be applicable to a wide range of design requirements. For example, in one embodiment, the first and second layers of the laminate are in intimate contact and the magnetic coupling is provided by exchange coupling. The exchange coupling may be adjusted by forming the laminate of a plurality of thin alternating layers of the materials forming the first and second layers. In another embodiment, a non-magnetic spacer may be disposed between the first and second layers of the laminate. In one option, the non-magnetic spacer is sufficiently thick to make the exchange interaction between the magnetic layer negligibly small. In this embodiment, the coupling between the first and second layers will be magnetostatic in origin, and the thickness of the non-magnetic spacer may be adjusted to optimize the magnetostatic coupling. In another option, a very thin non-magnetic spacer, on the order of 10 angstroms, is used to weaken or tune the strength of the exchange interaction by varying the spacer thickness. A further embodiment is to deposit a very thin layer of antiferromagnetic spacer material between the first and second layer. The antiferromagnetic spacer will orient the magnetization of the high and low $H_k$ materials antiparallel for a magnetically more stable structure.

BRIEF DESCRIPTION OF THE DRAWINGS

FIGS. 1b and 1c are magnetization curves for the easy axis and hard axis, respectively of the structure of FIG. 1a.

FIGS. 2b and 2c are magnetization curves for the easy axis and hard axis, respectively of the structure of FIG. 2a.

FIGS. 3b and 3c are magnetization curves for the easy axis and a hard axis, respectively, of the embodiment of FIG. 3a.

FIG. 4a represents a thin film structure of the present invention wherein the first and second layer as illustrated in FIG. 1a form a sublaminate comprising at least a pair of said sublaminates.

FIG. 4b is identical to FIG. 4a except that a layer of non-magnetic material is sandwiched between each pair of said sublaminates.

FIG. 4c is similar to FIG. 4a except that the sublaminates are formed identical to FIG. 2a and a layer of non-magnetic material is sandwiched between each pair of said sublaminates.

DETAILED DESCRIPTION OF THE INVENTION

Figure 1A:
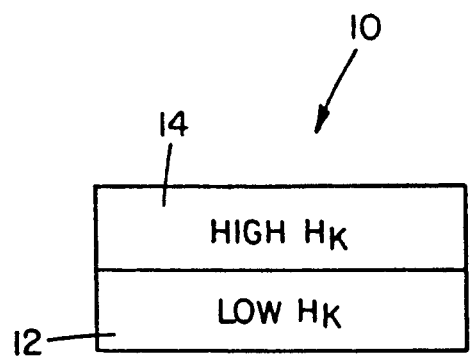
FIG. 1a is a cross-section of a laminated thin film structure of the present invention.

Referring now to the drawings, FIG. 1a is a cross-sectional view of a laminate 10 of the present invention. The laminate 10 is comprised of a first layer 12 of magnetic material and a second layer 14 of magnetic material coupled to the first layer 12. In accordance with the invention, the first layer of magnetic material 12 has a low anisotropy field $H_k$ below 5 Oe. Layer 12 is a high initial permeability material such as permalloy. The initial permeability of the first layer is in the range greater than 1000. In addition, the first layer has a saturation flux density $B_s$ of about 0.8 Tesla to 2.5 Tesla. The second layer of magnetic material 14 has a high anisotropy field $H_k$ in excess of about 10 Oe and a coercivity $H_c$ less than 1 Oe. The initial permeability of layer 14 is in excess of about 800.

Figure 5A:
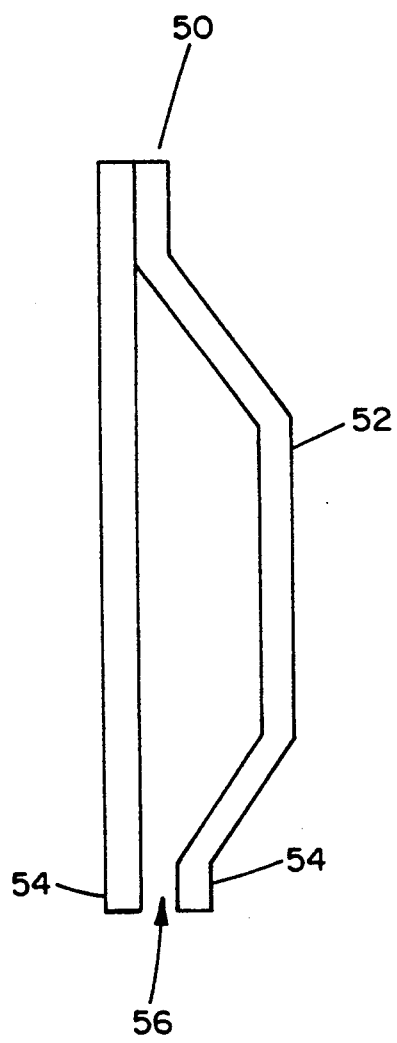
FIGS. 5a and 5b show a typical shape of a yoke and poletip of an inductive thin film head having the structure of the present invention.

As is well known in the art, and as is shown in FIG. 5a, a magnetic recording head 50 includes a pair of poletips 54 and yoke portions 52, each pair being separated by a gap 56. The structure 10 shown in FIG. 1a is a cross-section parallel to the recording medium of one of the pair of poletips and/or yoke portions of a recording head formed by the inventive structure. The gap separating the poletip and yoke portions can be either in the space above layer 14 or in the space below layer 12 as shown in FIG. 1a. If the gap is in the space above layer 14, the poletip and/or yoke portion not shown would comprise a "mirror image" of the laminate 10 having a layer identical to layer 14 adjacent the gap and a layer identical to layer 12 spaced from the gap. Likewise, if the gap is in the region below layer 12, then the poletip and/or yoke portion not shown would have a layer identical to layer 12 adjacent the gap and a layer identical to layer 14 spaced from the gap. Alternatively, the layers adjacent the gap can be different so that the configuration would be 12/14/gap/12/14. In addition, the present invention also applies to a perpendicular recording head in which there is only one pole and no gap.

The laminate 10 exhibits a low anisotropy at relatively small applied fields during the read operation (and therefore high $\mu_i$ and high efficiency) and a large anisotropy at high applied fields during the write operation. In addition to the dual anisotropy behavior described above, laminate 10 exhibits a low coercivity at both low and high fields. Thus, the laminate 10 provides improved domain stability following the write operation and improved reproducing sensitivity during the read operation.

The present invention provides an optimization of the magnetic coupling between the high and low $H_k$ films. For narrow poletips made from permalloy, of 5 μm or less, the domain pattern can exhibit a magnetization in the hard axis direction, which is parallel to the flux flow. The coupling of the laminate of the invention is sufficiently strong so that the high $H_k$ material helps restore a magnetization within the low $H_k$ permalloy material transverse to the flux flow, the easy axis direction. At the same time, the coupling is sufficiently weak to allow the laminate to respond with the dual anisotropy.

Moreover, when a film is patterned into a narrow stripe, the magnetic easy axis can change its orientation due to the influence of stress. Permalloy, with its low intrinsic $H_k$ is particularly susceptible to changes in $H_k$ resulting from stresses. When this happens, a "wrong" orientation is present in the stripe. However, in the laminated stripes of the present invention, the high $H_k$ material is effective in orienting (or aligning) the low $H_k$ material, and the laminate has an even higher initial permeability than when permalloy is "properly" oriented. The range of $H_k$ for the low $H_k$ material is from 0 to 5 Oe, with easy axis oriented along any direction, but preferably perpendicular or parallel to the easy axis of the high $H_k$ material.

An example of the material that may be used for layer 14 that exhibits the required magnetic properties is an alloy of the composition $Co_xFe_yCu_z$ wherein x, y and z represent the weight percent, respectively of the Co, Fe and Cu which is present in the alloys. X is in the range of about 66 to 92 and preferably about 73 to 89, y is in the range of about 6 to 14 and preferably about 8 to 13 and z is in the range of about 2 to 20 and preferably about 4 to 14. The CoFeCu alloy suitable for use in the present invention is disclosed in the concurrently filed U.S. patent application Ser. No. 571,804, referenced above and incorporated herein by reference. The CoFeCu alloy has the following electromagnetic properties:

a saturation induction value in excess of abut 16,000 Gauss and preferably of about 18,000 to 20,000 Gauss, an initial permeability value in excess of about 800 and preferably of about 1500, an anisotropy value in excess of about 10 Oe and preferably of about 13 to 18 Oe, a coercivity value of less than 2 Oe, preferably less than 1 Oe, a magnetostriction value of less than $10^{-6}$.

The CoFeCu alloy described above can be made by conventional fabrication techniques. In addition, the lamination of the various layers forming the laminate of the invention may be made by using well known electroplating or other deposition technologies.

An example of the material suitable for layer 12, such as permalloy, has the following magnetic properties:

a magnetic saturation induction value of about 10,000 Gauss, an anisotropy value of up to 5 Oe and preferably of about $-5$ to 2 Oe, a coercivity value of less than 1 Oe and preferably of less than 0.5 Oe, and, a magnetostriction value of less than $10^{-6}$.

Figure 1B:
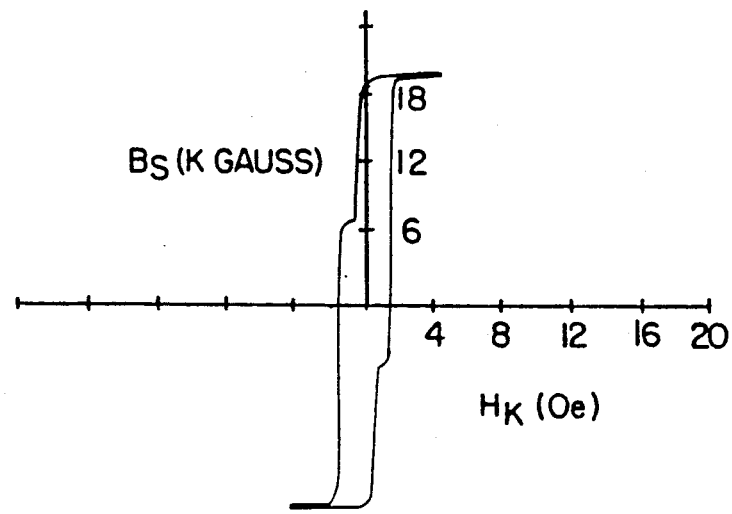
Figure 1C:
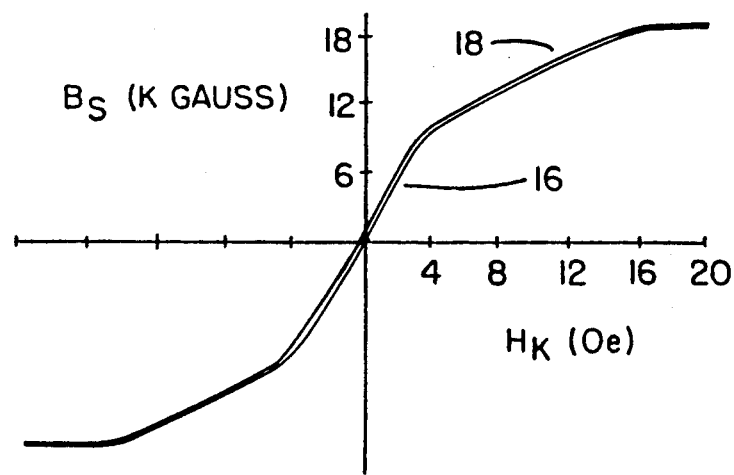

FIG. 1b, shows the B-H magnetization curve for the easy axis direction for the laminate of FIG. 1a in which layer 12 is permalloy and layer 14 is a CoFeCu alloy. The coercivity, $H_c$ is equal to approximately one half the width of the magnetization curve. As can be seen, the composite $H_c$ of the laminate is about 0.87 Oe which is very low, and which results from the combination of the $H_c$ of permalloy of 0.5 Oe and the $H_c$ of CoFeCu of about 1 Oe. FIG. 1c, shows the magnetization curve in the hard axis direction from which the dual anisotropy behavior can be observed. An increase in the hard axis field produces a steep initial response in region 16 due to the high initial permeability of the low $H_k$ material of layer 12. When the applied field reaches $H_k$ of the low anisotropy material, saturation is apparently obtained in the low $H_k$ film 12. A further increase of the hard axis field produces a response with a more gradual slope characteristic of the high $H_k$ material, in region 18.

In laminate 10 shown in FIG. 1a, the magnetic layers 12 and 14 are in intimate contact which results in an exchange coupling between the layers. The exchange coupling maintains the magnetization aligned parallel on both sides of the boundary between the layers. The magnetization vectors of the two films are parallel at the interface, and the exchange makes them stay nearly parallel to a thickness of a few tenths of one micron. The hard axis response of FIG. 1c can be analyzed to show that when the hard axis field is increased from 0, the low $H_k$ film responds independently of the high $H_k$ film except for a transition region near the boundary between the two layers where magnetization changes continuously because of the exchange coupling. This transition region resembles a domain wall whose plane coincides with that of the film. The thickness of this wall is determined by the balance of the exchange energy, which tends to make the wall thicker, and the effective anisotropy energy, which includes the applied field, that tends to make the wall thinner. Since this domain wall possesses the essential features of commonly occurring walls that separate magnetic domains, the thickness can be estimated as approximately equal to the width of a Bloch wall in bulk material. In permalloy, such a wall is about 1 $\mu$m thick.

Figure 2A:
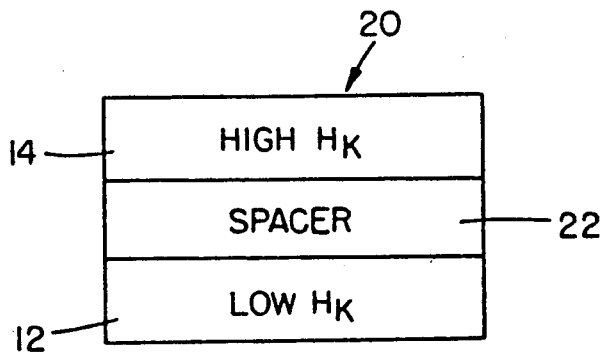
FIG. 2a is a cross-section of an alternative embodiment of the laminated film structure of the present invention.

In another embodiment, as shown in FIG. 2a, a spacer 22 is provided between layers 12 and 14 to form laminate 20. In one option, laminate 20 is provided with a very thin non-magnetic spacer 22 (for example 10 Å of copper) to weaken the exchange interaction. The exchange can be tuned by varying the spacer thickness. In this way, the exchange would still act between the two films with different $H_k$, but the interaction region would be decreased in thickness.

Another option is to deposit layer 22 in the form of a very thin layer of antiferromagnetic spacer material. This would have the advantage of orienting the magnetization of the high and low $H_k$ materials antiparallel for a magnetically more stable configuration. The spacer could be achieved by either depositing a very thin layer of material such as chromium or by oxidizing the NiFe surface thus forming NiO. Both chromium and NiO are examples of antiferromagnets.

In yet another option, laminate 20 of FIG. 2a includes a layer 22 of non-magnetic material thick enough to make the exchange coupling between layer 12 of low $H_k$ material and layer 14 of high $H_k$ material negligibly small. The coupling between the low and high $H_k$ films in this embodiment is magnetostatic in origin. It is known that this coupling can be quite strong for a 100 angstrom thick spacer as shown by Slonczewski et al., IEEE Trans. Mag. 24(3) 1988.

Figure 2B:
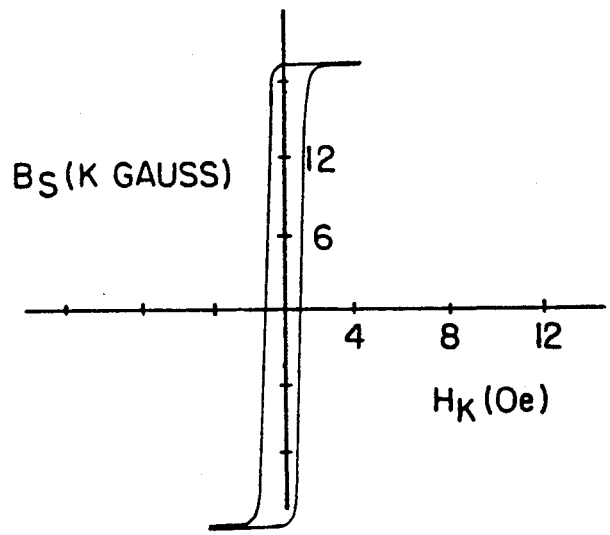
Figure 2C:
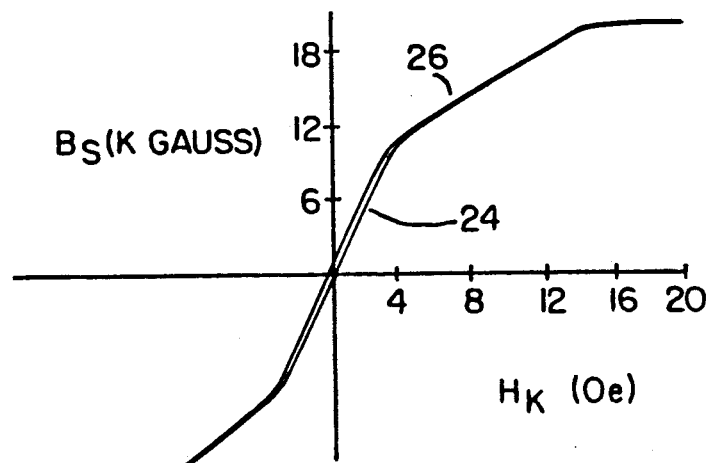

FIG. 2b is the easy axis magnetization curve and FIG. 2c is the hard axis curve of a laminate 20 formed with a thick spacer 22 providing magnetostatic coupling. FIG. 2b indicates that the composite coercivity $H_c$ is about 1.3 Oe. The curve differs from the curve of FIG. 1b in that it indicates that the two films switch independently of each other. In comparing the curves of FIG. 2c to the curve of FIG. 1c, it is seen that the dual anisotropy behavior exhibited in the hard axis direction is very similar. Thus, there is an initial steep response in the region 24 due to the high permeability of the low $H_k$ material, and a much more gradual slope at high applied fields due to the high $H_k$ material in region 26. The magnetostatic coupling can be optimized by varying the thickness of the spacer layer 22 and the optimization will depend on the particular application. For a thin film structure in which layers 12 and 14 are about 1 $\mu$m thick, a non-magnetic spacer of approximately 100 angstroms would provide the desired amount of magnetostatic coupling.

Figure 3A:
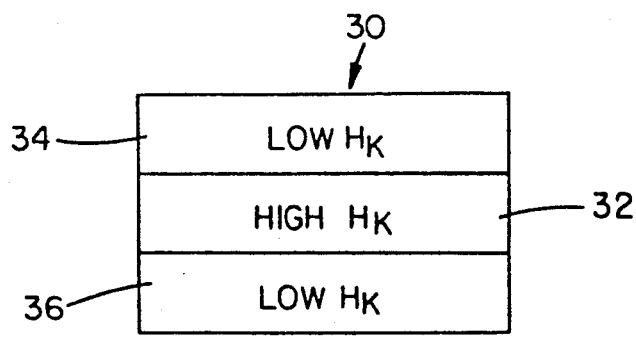
FIG. 3a is a cross-section of another embodiment of the laminated structure of the present invention.
Figure 3B:
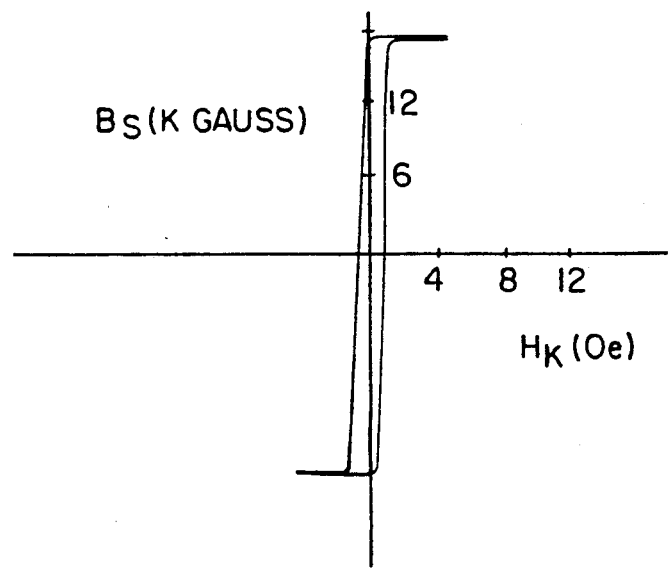
Figure 3C:
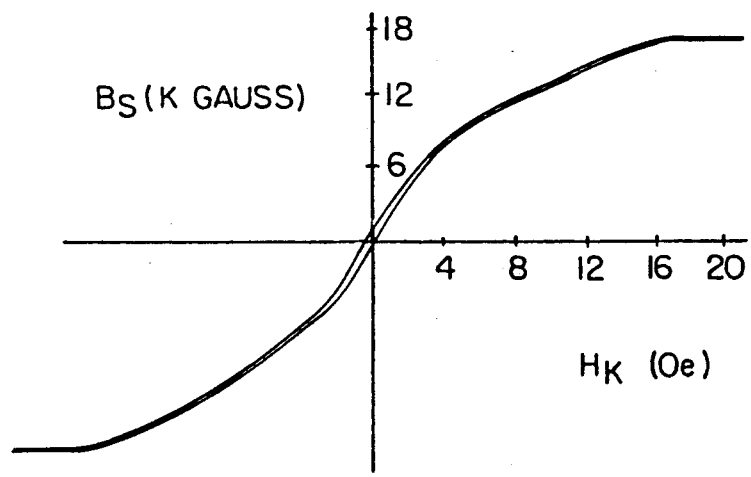

Numerous alternatives in the number and arrangement of the high and low $H_k$ materials is contemplated. For example, if a stronger coupling between the high and low $H_k$ materials is desired, the total thickness of the laminate can be built up from several thinner, alternating layers of the materials. An example of this stronger coupling is provided by laminate 30 shown in FIG. 3a. Laminate 30 includes a thick layer 32 of high $H_k$ material sandwiched between two layers 34 and 36 of low $H_k$ material that are thinner than layer 32. An example of the relative thicknesses would be layer 32 approximately 1 $\mu$m thick and layers 34 and 36 approximately 0.4 $\mu$m thick. In this embodiment, the coupling is stronger because of the two interfaces between the high and low $H_k$ films. As can be seen in FIG. 3b, the easy axis response is similar to the response shown in FIG. 1b for laminate 10. However, the hard axis response shown in FIG. 3c has more curvature and a less clearly defined transition between the two slopes, reflecting an increasing influence of the two film interfaces as opposed to the one film interface in laminate 10.

Figure 4A:
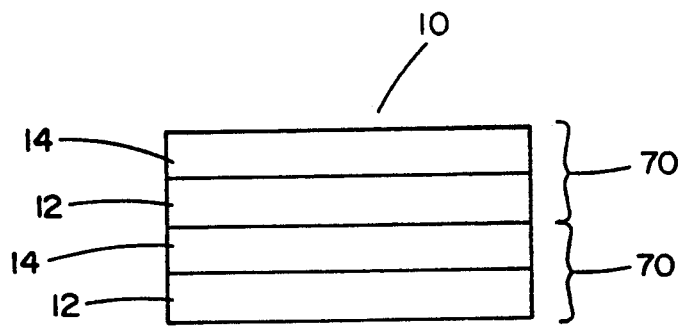
FIGS. 4a, 4b, and 4c illustrate alternative layer sequences which combine the structure of the present invention. For example.

In other applications, such as high frequency operation in excess of 10 Mhz, multiple laminations of the magnetic layers with high electrical resistivity spacers is desirable. An example of a layer sequence that combines the structure of the present invention includes a laminate formed by sublaminates comprised of laminate 10 of FIG. 1a. For example, as shown in FIG. 4a, the thin film structure 10 of the present invention is comprised of at least a pair of sublaminates 70, each sublaminate comprised of the first and second layers (14, 12) as illustrated in FIG. 1a.

Figure 4B:
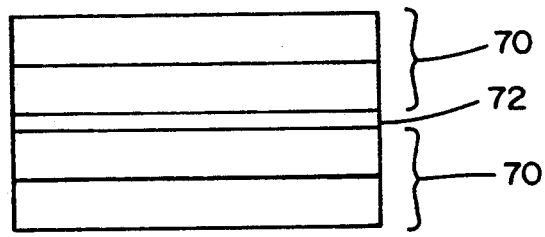
Figure 4C:
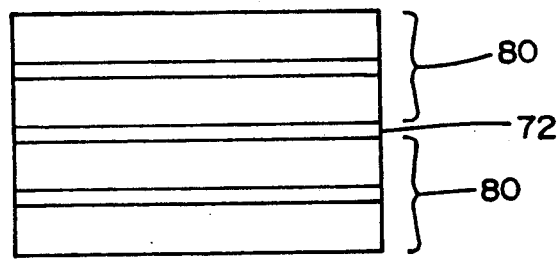

An alternative layer sequence is shown in FIG. 4b. Each of the sublaminates 70 in this example would be separated by a non-magnetic spacer 72. In another embodiment of a multiple layer system as shown in FIG. 4c, the laminate is comprised of a plurality of sublaminates 80 formed by the laminate 20 of FIG. 2a. Each of the sublaminates 80 in this example would also be separated by a non-magnetic 72 spacer.

The various laminates of the present invention may be used to form poletips and yoke regions of magnetic recording heads of various types, such as inductive and magnetorestrictive heads. As previously stated, FIG. 5a shows a portion of an inductive magnetic recording head 50 that can be used for writing and reading magnetic signals onto and from a magnetic recording medium having the structure of the present invention as illustrated in FIG. 1a. The heads may be longitudinal or perpendicular in type and have single or multiple tips. Such recording heads formed with laminates of the present invention have superior overwrite characteristics because of the higher moment and at the same time a superior reproducing sensitivity because of the low coercivity and the predominantly transverse magnetization in the poletip. In the case of the longitudinal recording head, the effective read and write gaps may have a different length depending on whether the high moment material is used in the inside or the outside of the gap. This feature will offer advantages in optimizing the head performance.

Figure 5B:
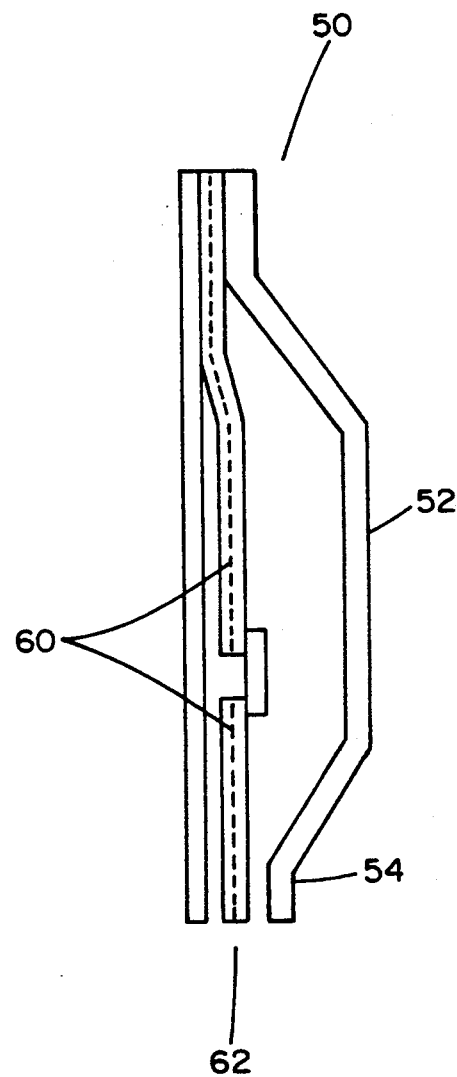

In some magnetoresistive read head designs, as shown in FIG. 5b, the magnetoresistive element 58 is removed from the poletip region 54 of the head and is positioned in the yoke region 52. In this type of head, the signal flux is brought to the element 58 with a strip of magnetic material called a fluxguide 60. In a fluxguide embodiment of the present invention, the fluxguide would be formed from any of the inventive laminates described above. As is shown in FIG. 5b, the fluxguide 60 is formed of the thin film structure illustrated in FIG. 1a.

The present invention provides a magnetic thin film structure having a dual anisotropy behavior in a laminate of a high $H_k$ material coupled either magnetostatically or via exchange coupling to a low $H_k$ material such as permalloy. The magnetic thin film structure of the present invention solves the problem of inductive head domain stability, while maintaining high reproducing sensitivity, due to the low coercivity of the high anisotropy material. In addition, the laminate will have a nominally zero magnetostriction because the alloys used for the high $H_k$ material have a composition with very low magnetization (less than $10^{-6}$). In addition, since the high $H_k$ material has a very high intrinsic anisotropy, the magnetic properties of the laminate will be very insensitive to stresses induced during device fabrication.

While the invention has been particularly shown and described with respect to the preferred embodiments thereof, it should be understood by those skilled in the art that the foregoing and other changes in form and detail may be made therein without departing from the spirit and scope of the invention which should be limited only by the scope of the appended claims.

Having thus described the invention, what is claimed as new, and is desired to be secured by Letters Patent is:

1. A magnetic thin film structure exhibiting dual anisotropy behavior comprising:
   a first layer of magnetic material having an anisotropy field, $H_k$, less than 5 Oe, said first layer being magnetically coupled to a second layer of magnetic material having an anisotropy field $H_k$ in excess of about 10 Oe and a coercivity, $H_c$, less than 2 Oe.

2. The structure of claim 1 wherein said second layer has an $H_k$ in the range of about 13 to 18 Oe, and Hc less than 1 Oe.

3. The structure of claim 2 wherein said second layer is an alloy comprising CoFeCu.

4. The structure of claim 3 wherein said alloy comprises:

$$Co_xFe_yCu_z,$$

wherein x, y and z represent, respectively, the weight percent of Co, Fe and Cu in said alloy, and
   x = 66 to 92
   y = 6 to 14
   Z = 2 to 20.

5. The structure of claim 4 wherein
   x = 73 to 86
   y = 11 to 13
   Z = 3 to 14.

6. The structure of claim 1 wherein said second layer has a saturation magnetostriction value of less than $10^{-6}$.

7. The structure of claim 6 wherein said second layer has a magnetic saturation value in excess of about 16,000 Gauss.

8. The structure of claim 7 wherein said second layer has a magnetic saturation value of about 20,000 Gauss.

9. The structure of claim 7 wherein said second layer has an initial permeability $\mu_i$ in excess of about 800.

10. The structure of claim 9 wherein said second layer has a $\mu_i$ of about 1500.

11. The structure of claim 1 further including a layer of non-magnetic material sandwiched between said first and second layers, said layer of non-magnetic material having a thickness to provide a magnetostatic coupling between said first and second layers.

12. The structure of claim 11 wherein said first, second and non-magnetic layers form a sublaminate of a laminate comprising at least a pair of said sublaminates and a further layer of said non-magnetic material sandwiched between each pair of said sublaminates.

13. The structure of claim 12 wherein said structure comprises a portion of a magnetic recording head.

14. The structure of claim 13 wherein said structure comprises a yoke region and at least one poletip of said magnetic recording head.

15. The structure of claim 14 wherein said structure further comprises a flux guide of said magnetic recording head.

16. The structure of claim 1 further including a third layer of magnetic material coupled to said second layer of magnetic material on an opposing side thereof to said first layer, said third layer having an anisotropy field $H_k$ less than 5 Oe.

17. The structure of claim 1 wherein said structure comprising a portion of a magnetic recording head.

18. The structure of claim 17 wherein said structure comprises a yoke region and at least one poletip of said magnetic recording head.

19. The structure of claim 18 wherein said structure further comprises a flux guide of said magnetic recording head.

20. The structure of claim 1 wherein said first and second layer form a sublaminate of a laminate comprising at least a pair of said sublaminates.

21. The structure of claim 20 further including a layer of non-magnetic material sandwiched between each pair of said sublaminates.

22. The structure of claim 21 wherein said structure comprises a portion of a magnetic recording head.

23. The structure of claim 22 wherein said structure comprises a yoke region and at least one poletip of said magnetic recording head.

24. The structure of claim 23 wherein said structure further comprises a flux guide of said magnetic recording head.

25. The structure of claim 21 further including a layer of non-magnetic material sandwiched between said first and second layers, said layer of non-magnetic material having a thickness to provide a weakened magnetic exchange coupling between said first and second layers.

26. The structure of claim 21 further including a layer of antiferromagnetic material sandwiched between said first and second layers.

27. The structure of claim 20 wherein said structure comprises a portion of a magnetic recording head.

28. The structure of claim 27 wherein said structure comprises a yoke region and at least one poletip of said magnetic recording head.

29. The structure of claim 27 wherein said structure further comprises a flux guide of said magnetic recording head.

30. The structure of claim 1 further including a layer of non-magnetic material sandwiched between said first and second layers, said layers of non-magnetic material having a thickness to provide a weakened magnetic exchange coupling between said first and second layers.

31. The structure of claim 30 wherein said first, second and non-magnetic layers form a sublaminate of a laminate comprising at least a pair of said sublaminates and a further layer of said non-magnetic material sandwiched between each pair of said sublaminates.

32. The structure of claim 1 further including a layer of antiferromagnetic material sandwiched between said first and second layers.

33. The structure of claim 22 wherein said first, second and non-magnetic layers form a sublaminate of a laminate comprising at least a pair of said sublaminates and a further layer of said non-magnetic material sandwiched between each pair of said sublaminates.

* * * * *